United States Patent
Chen et al.

(10) Patent No.: US 12,400,330 B2
(45) Date of Patent: Aug. 26, 2025

(54) METHOD OF TRACKING MOVEMENT OF PARTICLES IN BRONCHUS

(71) Applicant: Anivance AI Corporation, Hsinchu County (TW)

(72) Inventors: Guan-Yu Chen, Zhubei (TW); Ren-Hao Xie, Zhubei (TW); Shiue-Luen Chen, Yuanshan Township (TW)

(73) Assignee: Anivance AI Corporation, Hsinchu County (TW)

( * ) Notice: Subject to any disclaimer, the term of this patent is extended or adjusted under 35 U.S.C. 154(b) by 458 days.

(21) Appl. No.: 18/172,706

(22) Filed: Feb. 22, 2023

(65) Prior Publication Data
US 2024/0037745 A1    Feb. 1, 2024

(30) Foreign Application Priority Data
Jul. 28, 2022    (TW) .................. 111128449

(51) Int. Cl.
*G06T 7/00*    (2017.01)
*G06V 10/25*    (2022.01)
(Continued)

(52) U.S. Cl.
CPC ............ *G06T 7/0014* (2013.01); *G06V 10/25* (2022.01); *G06V 10/28* (2022.01); *G06V 10/457* (2022.01);
(Continued)

(58) Field of Classification Search
CPC ......... G06T 7/0014; G06T 2207/10016; G06T 2207/30061; G06T 7/223;
(Continued)

(56) References Cited

U.S. PATENT DOCUMENTS

| | | | |
|---|---|---|---|
| 2001/0033679 A1* | 10/2001 | Hasegawa ............ | A61B 1/0623 382/128 |
| 2013/0018256 A1* | 1/2013 | Kislev ................... | A61B 1/043 600/431 |

(Continued)

OTHER PUBLICATIONS

Johanna V. Rahm et al., "Diffusion State Transitions in Single-Particle Trajectories of MET Receptor Tyrosine Kinase Measured in Live Cells," Frontiers in Computer Science, vol. 3, pp. 1-8, 2021.

*Primary Examiner* — Van D Huynh
(74) *Attorney, Agent, or Firm* — Winston Hsu

(57) ABSTRACT

A method of tracking movement of particles in bronchus includes obtaining, from a video of the particles, a plurality of processed images, each of which contains a plurality of particle portions representing the particles, and implementing a tracking process for a reference image of the processed images. The tracking process includes, for each particle portion in the reference image, selecting a to-be-compared portion from among the particle portions in a next image immediately following the reference image, obtaining an expected range of movement of the particle represented by the particle portion according to a position of the particle portion, determining whether a corresponding position in the reference image that corresponds to a position of the to-be-compared portion in the next image is within the expected range, and storing the position of the to-be-compared portion into a track record that is associated with the particle when the determination is affirmative.

12 Claims, 4 Drawing Sheets

(51) Int. Cl.
*G06V 10/28* (2022.01)
*G06V 10/44* (2022.01)

(52) U.S. Cl.
CPC ............... *G06T 2207/10016* (2013.01); *G06T 2207/30061* (2013.01); *G06V 2201/07* (2022.01)

(58) Field of Classification Search
CPC .......... G06T 2207/30241; G06T 7/246; G06V 10/25; G06V 10/28; G06V 10/457; G06V 2201/07
See application file for complete search history.

(56) References Cited

U.S. PATENT DOCUMENTS

| | | | |
|---|---|---|---|
| 2013/0208943 A1* | 8/2013 | Chuang | G06T 7/246 |
| | | | 382/103 |
| 2015/0065849 A1* | 3/2015 | Burlina | A61B 5/0077 |
| | | | 600/407 |
| 2015/0252329 A1 | 9/2015 | Ostrowski | |
| 2016/0125598 A1* | 5/2016 | Kusner | G06T 7/62 |
| | | | 382/103 |
| 2020/0124516 A1* | 4/2020 | Vidal | G06T 7/20 |
| 2020/0245905 A1* | 8/2020 | Chen | A61B 1/00177 |
| 2024/0271102 A1* | 8/2024 | Ren | C12M 23/12 |

* cited by examiner

METHOD OF TRACKING MOVEMENT OF PARTICLES IN BRONCHUS

CROSS-REFERENCE TO RELATED APPLICATION

This application claims priority to Taiwanese Invention Patent Application No. 111128449, filed on Jul. 28, 2022.

FIELD

The disclosure relates to a method of tracking movement of particles in bronchus, and more particularly to a method of tracking movement of particles attributed to beating of cilia in bronchus.

BACKGROUND

Ciliated cells of small airways in the bronchus of the human body have motile cilia and are mainly responsible for the removal of foreign pollutants (e.g., particulate matter), sputum or mucus. A conventional method for analyzing the clearing ability of the cilia includes recording a video that captures movement of particles attributed to the beating of the cilia, and then using an advanced microscope system and a charge-coupled device (CCD) to capture the video for a user to track the movement of particles in the video with naked eye. However, using human eye for tracking is not only time consuming but also exhausting.

SUMMARY

Therefore, an object of the disclosure is to provide a method of tracking movement of particles that can alleviate at least one of the drawbacks of the prior art.

According to the disclosure, a method of tracking movement of particles in bronchus using a video of the particles that are moved by beating of cilia is provided. The video contains a series of consecutive original images. The method includes steps of processing the original images of the video to obtain a plurality of processed images, respectively, and implementing a tracking process for a reference one of the processed images (hereinafter referred to as "reference image"). Each of the processed images contains a plurality of particle portions each representing one of the particles. The tracking process includes: for each of the particle portions in the reference image, selecting a to-be-compared portion from among the particle portions in a next one of the processed images (hereinafter referred to as "next image") that immediately follows the reference image; for each of the particle portions in the reference image, obtaining an expected range of movement of the particle represented by the particle portion according to a position of the particle portion in the reference image; for each of the particle portions in the reference image, determining whether a corresponding position in the reference image that corresponds to a position of the to-be-compared portion in the next image is within the expected range of movement of the particle represented by the particle portion; and for each of the particle portions in the reference image, storing the position of the to-be-compared portion into a track record that is associated with the particle represented by the particle portion when it is determined that the corresponding position is within the expected range of movement.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
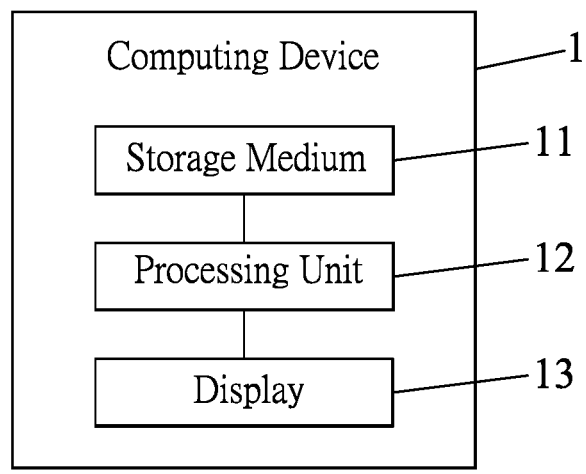
FIG. 1 is a block diagram illustrating a computing device for implementing a method of tracking movement of particles according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "coupled to" or "connected to" may refer to a direct connection among a plurality of electrical apparatus/devices/equipment via an electrically conductive material (e.g., an electrical wire), or an indirect connection between two electrical apparatus/devices/equipment via another one or more apparatus/devices/equipment, or wireless communication.

A method of tracking movement of a plurality of particles in bronchus according to an embodiment of the disclosure is applicable for tracking movement of particles (for example, particles that are moved by beating of cilia) in a video, and is performed by a computing device 1 shown in FIG. 1. The computing device 1 includes a storage medium 11, a display 13, and a processing unit 12 electrically connected to the storage medium 11 and the display 13.

The computing device 1 in the embodiment may be, but is not limited to, a personal computer, a server, a tablet or a laptop. The processing unit 12 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc. The storage medium 11 may be embodied using computer-readable storage medium such as hard disk drive(s), random access memory (RAM), read only memory (ROM), programmable ROM (PROM), firmware, flash memory, etc.

Figure 2:
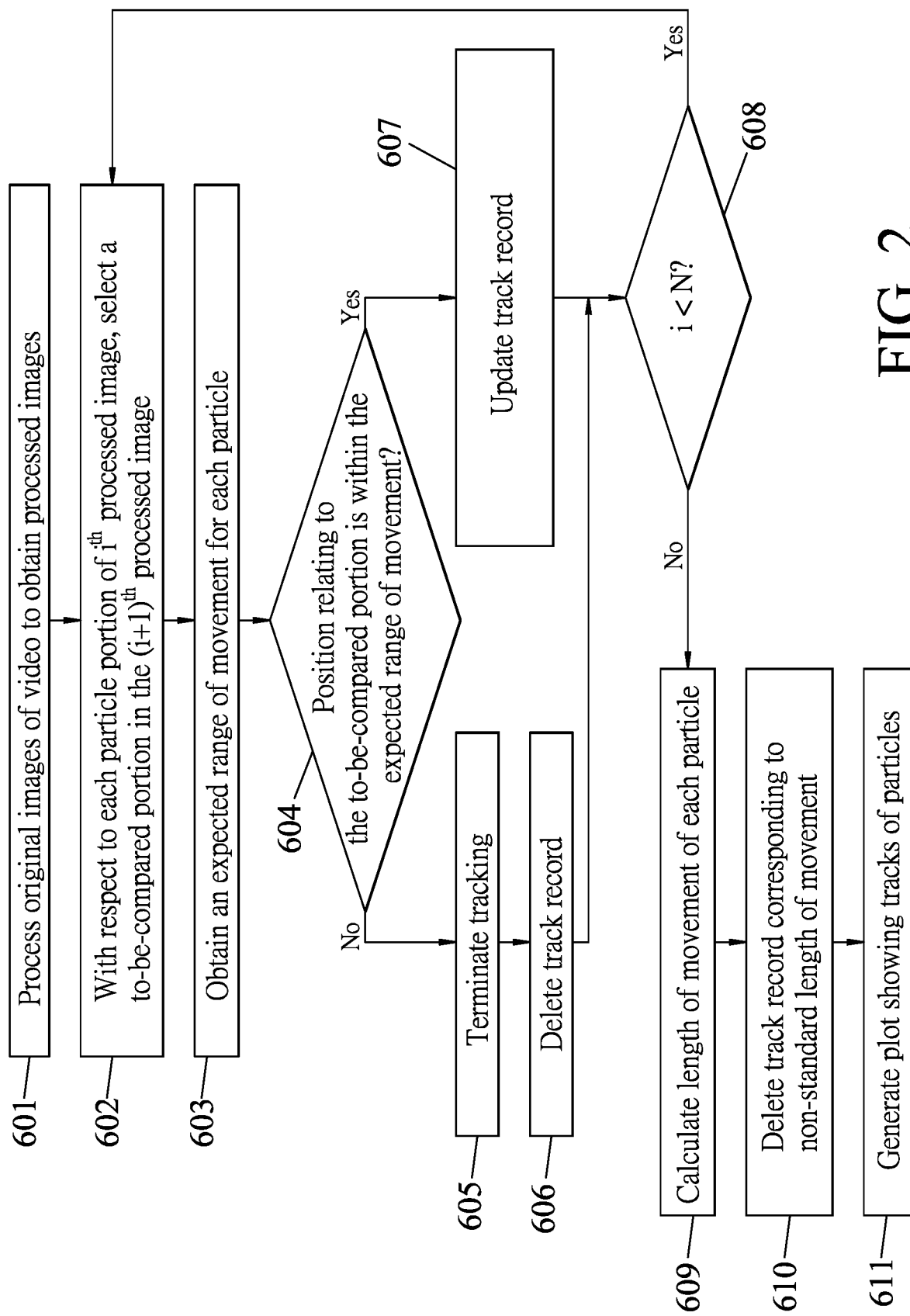
FIG. 2 is a flow chart illustrating the method of tracking movement of particles according to an embodiment of the disclosure.

Further referring to FIG. 2, the method of tracking movement of particles according to an embodiment of the disclosure is implemented using the processing unit 12. The embodiment includes steps 601-611.

In step 601, the processing unit 12 obtains a video that contains a series of consecutive original images, and processes the original images of the video to obtain a plurality of processed images, respectively. Each processed image includes a plurality of particle portions each representing one of the particles. Further, the processing unit 12 sets a value of a variable (i) to one in step 601. For example, the video may be pre-stored in the storage medium 11, and the processing unit 12 may obtain the video by accessing the storage medium 11; alternatively, the processing unit 12 may obtain the video from an external source that stores the video and that is electrically connected to the computing device 1.

Figure 3:
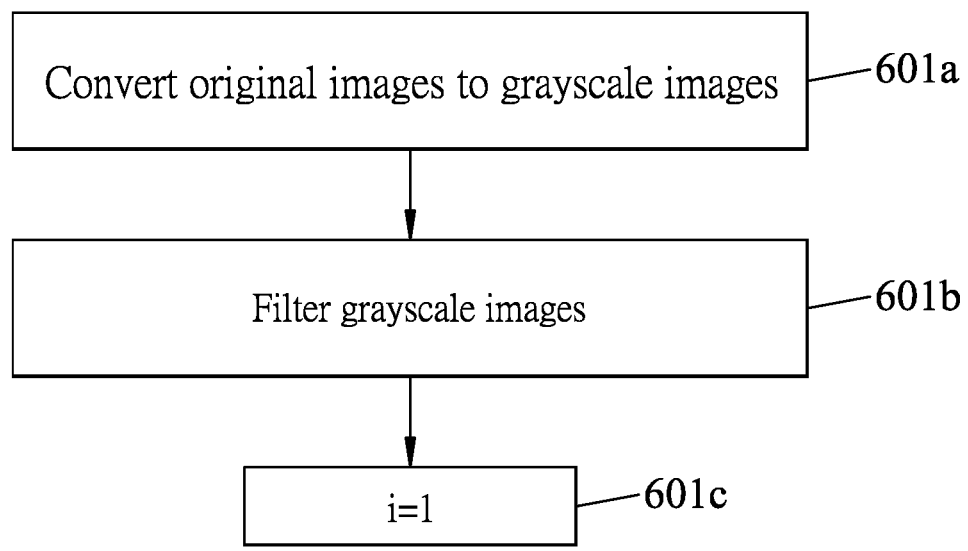
FIG. 3 is a flow chart illustrating steps of processing original images of a video of the particles.

Further referring to FIG. 3, step 601 includes the following sub-steps.

In sub-step 601a, the processing unit 12 obtains the video and converts the original images to a plurality of grayscale images, respectively. Each of the grayscale images has a plurality of pixels.

In sub-step 601b, the processing unit 12 filters each of the grayscale images to keep only those of the pixels each having a pixel value greater than a threshold value, where the threshold value may be, for example, between 20 and 150. The grayscale images thus filtered serve as the processed images. It should be noted that each of the particle portions may be composed of one or more of said those pixels of the grayscale image.

In sub-step 601c, the processing unit 12 sets the value of the variable (i) to one.

Then, for a reference one of the processed images, the processing unit 12 implements a tracking process including steps 602-608.

In step 602, the processing unit 12 uses an $i^{th}$ one of the processed images as the reference one of the processed images (hereinafter referred to as "reference image"), and then for each of the particle portions in the reference image, the processing unit 12 selects a to-be-compared portion from among the particle portions in a next one of the processed images (hereinafter referred to as "next image") that immediately follows the reference image (temporally speaking). In this embodiment, for each particle portion in the reference image, the processing unit 12 selects the corresponding to-be-compared portion in the next image by selecting the particle portion in the next image that is closest to a position in the next image that corresponds to a position of the particle portion in the reference image. By "a first position in a first image corresponding to a second position in a second image," it is meant that when the first and second images are superimposed, the first and second positions would coincide (i.e., the two positions have the same coordinates in a coordinate system defined by the images). Since the speed of movement of the particles from beating of cilia is not fast, and the frame rate when filming the video can be 30 or more frames per second, the position of each particle portion in the reference image can be very close to the position of the corresponding particle portion in the next image (if the two images are superimposed), and thus the above mentioned selection method is valid.

In step 603, for each particle portion in the reference image, the processing unit 12 obtains an expected range of movement of the particle represented by the particle portion. In this embodiment, the processing unit 12 defines a predetermined region surrounding a center of the particle portion in the reference image as the expected range. In the case where the particle portion is composed of only one pixel, the predetermined region has eight-connected pixels that are directly connected to the particle portion. In the case where the particle portion is composed of more than one pixel, the predetermined region has eight-connected pixels that are directly connected to a central pixel of the particle portion.

The following steps 604 to 607 will be performed with respect to each particle portion in the reference image. In step 604, for the particle portion in the reference image, the processing unit 12 determines whether a position in the reference image that corresponds to the position of the corresponding to-be-compared portion in the next image is within the expected range of movement related to the particle portion. When it is determined that the position in the reference image that corresponds to the position of the corresponding to-be-compared portion is within the expected range of movement, the flow proceeds to step 607; otherwise, the flow proceeds to step 605 when it is determined that the position in the reference image that corresponds to the position of the corresponding to-be-compared portion is not within the expected range of movement.

It should be noted that, since the size of each particle is merely 2 micrometers or so, and the speed of movement of particles from beating of cilia is not fast, with the frame rate of filming the video being, for example, 30 or more frames per second, movement of each particle can be tracked by determining whether the position in the reference image that corresponds to the position of the corresponding to-be-compared portion is within the expected range of movement related to the corresponding particle portion. The position of each particle portion in the reference image or the next image can be the center of the particle portion (i.e., the particle portion is composed of multiple pixels, and a position of the central pixel of the particle portion is considered as the position of the particle portion) or the location of the entire particle portion (i.e., the particle portion is composed of only one pixel, and a position of the one pixel is the position of the particle portion).

In step 605, the processing unit 12 terminates tracking of the particle represented by the particle portion. In some embodiments, the to-be-compared portion in the next image will be ignored from the tracking process when the next image serves as the reference image.

In step 606, the processing unit 12 deletes a track record that is associated with the particle represented by the particle portion from the storage medium 11.

In step 607, the processing unit 12 records the position of the to-be-compared portion in the next image into the track record that is associated with the particle. The track records associated respectively with the particles are stored in the storage medium 11.

In step 608, the processing unit 12 adds one to the value of the variable (i) and then determines whether the value of the variable (i) is smaller than a total number (N) of the processed images. When it is determined that the value of the variable (i) is smaller than the total number (N) of the processed images, the flow goes back to step 602; otherwise, when it is determined that the value of the variable (i) is not smaller than the total number (N) of the processed images, the tracking process is terminated and the flow proceeds to step 609.

In step 609, for each particle, the processing unit 12 calculates, based on the corresponding track record that is associated with the particle and stored in the storage medium 11, a length of movement of the particle.

In step 610, for each of the track records, the processing unit 12 deletes the track record when the length of movement that is calculated based on the track record is not within a standard range. The standard range can be from an arithmetic average of the lengths of movement calculated respectively based on the track records that are associated respectively with the particles to one half of the arithmetic average. For example, if the arithmetic average of the lengths of movement is 1 cm, the standard range will be from 0.5 to 1 cm. In principle, under normal conditions, the lengths of movement of particles moved by beating of cilia should be within the standard range; however, in special cases such as where a particle is attached to the cilia and moves along with the cilia, the length of movement of such particle will be particularly short and not within the standard range (i.e., less than the lower limit of the standard range). In some other cases, a particle may be moving too fast because of over-intense beating of the cilia, and the length of movement of such particle will be long and exceed the upper limit of the standard range. Such particles with abnormal movements are not valuable for the evaluation of the clearing ability of cilia, and thus the track records of such particles should be ignored for the purpose of the evaluation and hence deleted in step 610.

Figure 4:
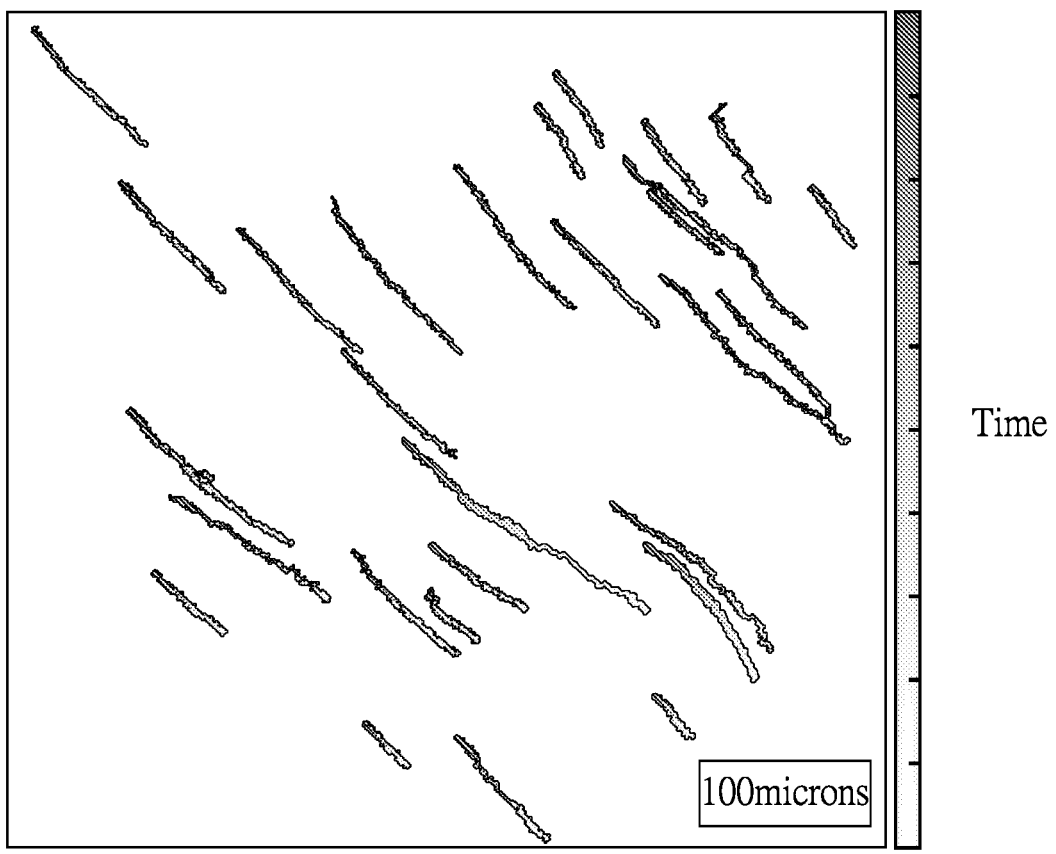
FIG. 4 is a schematic view illustrating tracks of particles according to a plurality of track records associated respectively with the particles.

In step 611, the processing unit 12 generates a plot showing tracks respectively of the particles (as shown in FIG. 4), and controls the display 13 to display the plot.

For example, in the first time of implementing the tracking process (i=1), assuming that there are twenty particle portions in the first processed image (i=1), twenty to-be-compared portions will be obtained in the second processed image, and then for each of the twenty particle portions, the processing unit 12 determines whether a position in the first processed image that corresponds to the position of the corresponding to-be-compared portion in the second processed image is within the expected range of movement related to the particle portion. It is assumed that two to-be-compared portions are not within the corresponding expected ranges of movement, so tracking of two particles represented by these two to-be-compared portions (i.e., represented by two particle portions that correspond to the two to-be-compared portions) is terminated and the track records associated respectively with the two particles are deleted. These two to-be-compared portions will be ignored from the tracking process when the second processed image serves as the reference image (i.e., when i=2). The remaining eighteen to-be-compared portions are within the corresponding expected ranges of movement and the positions of the eighteen to-be-compared portions are recorded into the respective track records. The value of the variable (i) is then incremented by one (i=2).

Subsequently, in the second time of implementing the tracking process (i=2), for the remaining eighteen particle portions in the second processed image, eighteen to-be-compared portions are obtained in the third processed image and for each of the eighteen particle portions, the processing unit 12 determines whether a position in the second processed image that corresponds to the position of the corresponding to-be-compared portion in the third processed image is within the expected range of movement related to the particle portion, so as to track the corresponding eighteen particles. The above-mentioned tracking process is repeated until the value of the variable (i) is not smaller than N (i.e., all but the last one of the processed images from the video have gone through the tracking process, taking turns to serve as the reference image). If there are fifteen particle portions remaining in the end, the length of movement of each of fifteen particles that are represented respectively by the fifteen particle portions is calculated based on the corresponding track record, and then any one of the track records that is associated with a particle with a length of movement not within the standard range is deleted to eliminate those particles that are substantially stationary or move excessively.

In summary, the method of tracking movement of particles according to the disclosure includes steps of: obtaining processed images respectively for the original images from the video by converting the original images to grayscale images and then filtering the grayscale images; for each particle portion in each of the processed images except for the last one of the processed images, selecting, as the corresponding to-be-compared portion for the particle portion, a particle portion in the next image that is closest to the particle portion in the processed image in terms of their relative positions in the respective images, determining whether a position in the processed image that corresponds to the position of the to-be-compared portion in the next image is within the expected range of movement related to the particle portion, and in the affirmative, recording the position of the to-be-compared portion in the track record that is associated with the corresponding particle, or otherwise terminating tracking of the corresponding particle and deleting the associated track record; calculating, based on the remaining track record(s), the length(s) of movement of the corresponding particle(s); and deleting any track record with the length of movement not within the standard range. The method can generate a plot showing the tracks of those particles that are significant for the evaluation of the clearing ability of cilia (i.e., without those particles that are almost stationary or move excessively), and the plot thus generated can be used to evaluate the movement of particles that are moved by beating of cilia recorded by the video for analyzing the clearing ability of the cilia.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method of tracking movement of particles in bronchus using a video of the particles that are moved by beating of cilia, the video containing a series of consecutive original images, the method comprising steps of:

processing the original images of the video to obtain a plurality of processed images, respectively, each of the processed images containing a plurality of particle portions each representing one of the particles; and for a reference one of the processed images, implementing a tracking process including for each of the particle portions in the reference one of the processed images, selecting a to-be-compared portion from among the particle portions in a next one of the processed images that immediately follows the reference one of the processed images, for each of the particle portions in the reference one of the processed images, obtaining an expected range of movement of the particle represented by the particle portion according to a position of the particle portion in the reference one of the processed images, for each of the particle portions in the reference one of the processed images, determining whether a corresponding position in the reference one of the processed images that corresponds to a position of the to-be-compared portion in the next one of the processed images is within the expected range of movement of the particle represented by the particle portion, and for each of the particle portions in the reference one of the processed images, storing the position of the to-be-compared portion into a track record that is associated with the particle represented by the particle portion when it is determined that the corresponding position is within the expected range of movement.

2. The method as claimed in claim 1, further comprising a step of, before implementing the tracking process, setting a value of a variable to one, wherein the tracking process further includes using an $i^{th}$ one of the processed images as the reference one of the processed images to implement the tracking process, where i is equal to the value of the variable, after storing the position of the to-be-compared portion into the track record, adding one to the value of the variable and then determining whether the value of the variable is less than a total number of the processed images, and repeating the tracking process when it is determined that the value of the variable is less than the total number of the processed images.

3. The method as claimed in claim 2, further comprising steps of:

calculating, according to the track record, a length of movement of the particle that is associated with the track record; and deleting the track record when the length of movement is not within a standard range.

4. The method as claimed in claim 3, wherein the standard range is from an arithmetic average of the lengths of movement calculated respectively from the track records that are associated respectively with the particles to one half of the arithmetic average.

5. The method as claimed in claim 1, wherein the step of processing the original images of the video to obtain a plurality of processed images includes, for each of the original images:

converting the original image to a grayscale image having a plurality of pixels; and filtering the grayscale image to keep only those of the pixels each having a pixel value greater than a threshold value.

6. The method as claimed in claim 1, wherein selecting the to-be-compared portion includes, for each of the particle portions in the reference one of the processed images, selecting a closest one of the particle portions in the next one of the processed images, where a position in the reference one of the processed images that corresponds to a position of the closest one of the particle portions in the next one of the processed images is closest to the particle portion in the reference one of the processed images.

7. The method as claimed in claim 2, wherein the tracking process further includes:

when it is determined that the corresponding position is not within the expected range of movement, ignoring the to-be-compared portion from the tracking process to be performed with respect to the next one of the processed images.

8. The method as claimed in claim 7, wherein the tracking process further includes:

when it is determined that the corresponding position is not within the expected range of movement, deleting the track record that is associated with the particle represented by the particle portion.

9. The method as claimed in claim 1, wherein obtaining the expected range of movement of the particle is to, for the particle portion, defining a predetermined region surrounding a center of the particle portion in the reference one of the processed images as the expected range of movement.

10. The method as claimed in claim 9, wherein, in a case where the particle portion is composed of only one pixel, the predetermined region of the particle portion has eight-connected pixels that are directly connected to the particle portion.

11. The method as claimed in claim 9, wherein, in a case where the particle portion is composed of multiple pixels, the predetermined region of the particle portion has eight-connected pixels that are directly connected to a central pixel of the particle portion.

12. The method as claimed in claim 1, further comprising a step of generating a plot showing tracks respectively of the particles according to the track records that are associated respectively to the particles.

* * * * *